Figure 1:
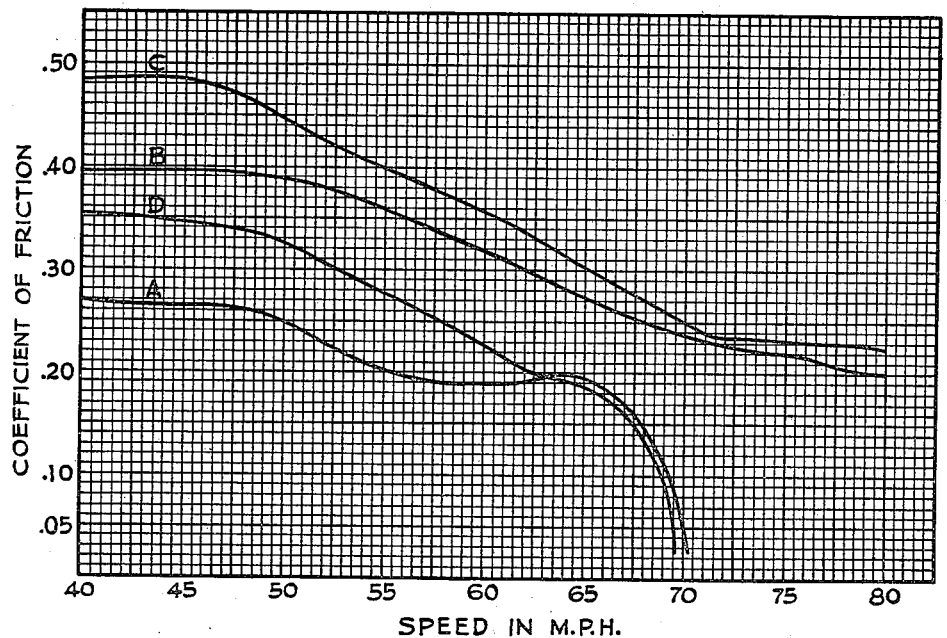

Oct. 1, 1946.   F. J. LOWEY ET AL   2,408,430
FRICTION COMPOSITION PRODUCT
Filed April 4, 1944

INVENTORS:
Samuel K. Wellman, Francis J. Lowey and
Charles H. Tower
BY
ATTORNEYS Patented Oct. 1, 1946

2,408,430

UNITED STATES PATENT OFFICE 2,408,430

FRICTION COMPOSITION PRODUCT

Francis J. Lowey, Bay Village, and Charles H. Tower, Cleveland, Ohio, assignors to The S. K. Wellman Company, Cleveland, Ohio, a corporation of Ohio Application April 4, 1944, Serial No. 529,490

6 Claims. (Cl. 75—22)

This invention relates to sintered metallic friction material, such as brake and clutch parts which are used to engage machine elements which move at varying speeds; and particularly relates to friction materials for use as braking members for vehicles and the like.

Friction material for vehicle wheel brakes, such as in automobiles and trucks, must be compounded and selected with many factors in mind if satisfactory operation is to be assured. These factors include, among others, the value of the coefficient of friction, the wear of the friction material, the noise or quietness of the material in operation, the wear of the surface engaged by the friction material, and the change in the value of coefficient of friction with changes in temperature, humidity, and speed of the engaged part when the friction material contacts it. All of these items must be considered, but probably the coefficient of friction is the more important.

With practically all known friction materials, including both metallic and nonmetallic friction materials, the value of the coefficient of friction decreases with increasing speed of sliding movement, and with increasing temperature of the friction materials. Most friction applications, of course, involve varying speeds of sliding movement, since it is the function of the friction material to slow down and stop the moving machine part; but there are installations where the speed is constant, as in tension brakes on hoisting machinery, where the function of the friction material is to apply a constant retarding force to a member rotating at a constant speed. Although the usual industrial braking applications involve varying speeds, as indicated above, in that the machine element must be slowed down and stopped, the stopping conditions are usually uniform and the machine element is always moving at the same speed when it is initially engaged by the friction material.

With installations of this type it is possible to use the conventional metallic friction material, since the operating conditions for each stop are the same. However, in some applications, and particularly in those of vehicles such as automobiles and other motor vehicles, this constant operation is not obtained. Thus, in the operation of an automobile it may be necessary in succession to stop the car from such widely varying speeds as 20 miles per hour and 80 miles per hour. It is obviously desirable that the friction material have a coefficient of friction that remains constant regardless of speed. However, friction materials do show a decreasing coefficient of friction with increasing speeds. This characteristic is termed "fade" by those in the art, and will be thus referred to herein.

Metallic friction materials made by pressing and sintering mixtures of metallic and nonmetallic powders have numerous advantages over nonmetallic materials in that they are less susceptible to changes in temperature and in atmospheric conditions; are less affected by extraneous oil, grease, and foreign matter, and often show less wear. However, they have a higher fade characteristic in applications such as an automobile brake, where the member to be slowed down or stopped rotates at different speeds at the time of engagement.

It is an object of our invention to produce a sintered metallic friction material which has all the desirable characteristics of the prior metallic friction materials, together with a high coefficient of friction and a low fade of such characteristic.

A still further object of the invention is the provision of a new and improved brake band having secured thereto a novel brake lining of sintered powdered material having a high coefficient of friction and a low fade characteristic.

Figure 2:
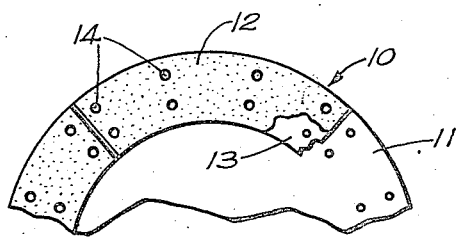

Other and further objects of our invention will be apparent from the following description, taken in conjunction with the accompanying drawing in which Fig. 1 shows a chart with curves representing the frictional characteristics of several sintered materials; and Fig. 2 is an elevation of a brake disc showing the friction material thereon, with parts broken away.

Sintered metallic friction materials generally comprise a porous sintered metallic matrix and a filler of metallic and nonmetallic substances disposed in the pores of the matrix. The matrix is formed of copper-tin-bronze in order to obtain the requisite strength and thermal conductivity. Iron is often added to impart strength and wear resistant properties, small amounts of lead are often added to reduce seizure, and nonmetallic materials, such as graphite and silica, are usually present—the graphite serving as a lubricant and the silica serving as a polishing agent to keep the engaged surface smooth and clean.

These metallic friction materials may, therefore, have the following composition:

| | Per cent |
|---|---|
| Copper | 60–75 |
| Tin | 4–10 |
| Iron | 5–10 |
| Silica | 2– 7 |
| Graphite | 3–10 |

To this composition lead in quantities of from 5–15% may be added for lubricating purposes.

A typical composition that has given good results for certain friction applications comprises:

A

| | Per cent by weight |
|---|---|
| Cu | 74 |
| Sn | 5 |
| Fe | 8 |
| C (graphite) | 9 |
| $SiO_2$ | 4 |

The material in all these compositions is prepared by mixing the ingredients in powder form, pressing the same to form a briquette, and heating the briquette to an elevated temperature to sinter the same.

Composition A, while satisfactory for some applications, is not suitable for an automobile brake in that it has a high fade characteristic; that is, although the material is satisfactory for low automobile speeds, when attempts are made to stop the car from relatively high speeds, the material has a too-low coefficient of friction and will not stop the automobile within a safe distance.

We have found that the addition of powdered or flake molybdenum sulphide to this composition in controlled amounts will render it suitable for use in an automobile brake in that the fade is less. This effect may be understood by reference to the drawing (Fig. 1), which is a chart showing the characteristics of four compositions. In this chart the average value of the coefficient of friction is plotted against the car speed in miles per hour. Curve A is for composition A given above, while curves B, C and D are for the following compositions:

B

| | Per cent by weight |
|---|---|
| Cu | 74 |
| Sn | 5 |
| Fe | 8 |
| C (graphite) | 9 |
| $SiO_2$ | 4 |
| | 100 |

$MoS_2$—Twelve parts by weight to each 100 parts by weight of the other ingredients.

C

| | Per cent by weight |
|---|---|
| Cu | 74 |
| Sn | 5 |
| Fe | 8 |
| C (graphite) | 9 |
| $SiO_2$ | 4 |
| | 100 |

$MoS_2$—Six parts by weight to each 100 parts by weight of the other ingredients.

D

| | Per cent by weight |
|---|---|
| Cu | 74 |
| Sn | 5 |
| Fe | 8 |
| C (graphite) | 9 |
| $SiO_2$ | 4 |
| | 100 |

C (graphite)—Six parts by weight to each 100 parts by weight of the other ingredients.

It is apparent from the drawing that composition A fades badly at high speeds, such as 65 miles per hour and over, and that it would not be a satisfactory friction material for an automobile. The addition of 12 parts by weight of molybdenum sulphide to this composition to produce composition B results in a marked decrease in fade at high speeds, and the car may be safely stopped from high speeds. The addition of 6 parts by weight of molybdenum sulphide to composition A to produce composition C also achieves the improvement in fade characteristics.

It is to be observed from the drawing that not only do compositions B and C fade less than composition A, but the coefficient of friction is higher at all speeds than composition A. In fact the coefficients of friction for compositions B and C are higher at speeds of seventy-five M. P. H. than at any speed above fifty-five M. P. H. for composition A. In other words, the addition of molybdenum sulphide not only reduces fade, but it also increases the coefficient of friction.

It has been suggested in the prior art that molybdenum sulphide, graphite, talc and mica are equivalent lubricating materials in sintered metallic materials for use as bearings. Neither graphite nor molybdenum sulphide appear to chemically combine with the other elements of the mixture, and it appears that they function primarily as filling material. Therefore, their equivalency should be on a volume basis. The specific gravity of molybdenum sulphide is about twice that of graphite, and, therefore, six parts by weight of graphite has a volume about equal to twelve parts by weight of molybdenum sulphide. Thus, the total amount of graphite in mix D has about the same volume as the 9 percent of graphite and twelve parts of molybdenum sulphide in mix B.

The drawing clearly shows that molybdenum sulphide is not a lubricating material, and that it is not an equivalent for graphite. Curve D represents the characteristics of composition D, which, as observed above, is formed by adding six parts of graphite to composition A to produce a total amount of graphite, that is equivalent in volume to the combined amount of graphite and molybdenum sulphide in composition B. If molybdenum sulphide and graphite were equivalents, composition D and composition B would have the same characteristics, but it is apparent from the drawing that this result is not obtained, and that graphite and molybdenum sulphide are not equivalents.

The values shown by the chart on the drawing were obtained on a dynamometer which reproduced stopping conditions in an automobile. This dynamometer comprised an automobile brake mounted on a wheel which was weighted to represent one-quarter of the momentum of an automobile. This wheel could be rotated at any desired speed to correspond to automobile speeds from 20 to 80 miles per hour. The test procedure was to rotate the wheel at a desired speed and then apply the brake to stop the wheel in a predetermined number of revolutions. A series of stops were made from various speeds between 40 and 80 miles per hour for each composition, and the number of revolutions required to stop the wheel and the brake pedal pressure used were recorded. From this data, knowing the moment of inertia of the wheel and the area of the friction material, it was possible to calculate the average value of the coefficient of friction of the material for each stop.

The dynamometer was operated so that the test conditions were the same for all materials. The values given in the drawing represent average results. Since the fade of metallic friction materials is not appreciable at slow speeds, the values for speeds below 40 miles per hour have not been given.

The ingredients of the compositions A, B, C and D have been given above as parts by weight, but, of course, they could be readily converted to percentages. The inclusion of the molybdenum sulphide in the total percentages would change the numerical percentages of the other ingredients in each composition, although the relative amounts are not changed. For convenience it has been found best to consider all the ingredients except molybdenum sulphide as constituting 100 parts by weight of a composition, and stating that to each 100 parts by weight of the composition molybdenum sulphide may be added. The best results appear to be obtained with the addition of about six parts by weight of molybdenum sulphide to each 100 parts by weight of the composition, but we have found that it can be added in amounts of from 3 to 12 parts by weight. Below three parts the fade characteristic of the composition is not improved, while amounts greater than twelve give a material having no better fade characteristics than a composition without molybdenum sulphide, and, in fact, deleteriously affect the fade characteristic.

For some purposes lead in an amount up to 15 percent may be added to the mixture to improve the wear characteristics of the material and decrease the tendency to score the member engaged by the friction material. It does not appear to us that the lead affects the fade characteristics.

The molybdenum sulphide used may be pure, but we have found that concentrated molybdenite, a molybdenum ore, can be satisfactorily used if the amount to be added is corrected for the amount of molybdenum sulphide contained in the ore. This concentrated ore usually contains about 86 percent molybdenum sulphide, about 10 percent silica, and about four percent oil left from the flotation concentration process together with minor amounts of impurities.

The preparation of the friction material requires the mixing of the finely divided ingredients. If the materials are dry and the molybdenum sulphide contains no oil, mixing can be done by merely dumping the materials into a ball mill. However, it is rather difficult to procure a uniform mixture in that the molybdenum sulphide, especially if it contains any oil, has a tendency to ball up and segregate. Furthermore, the long period of ball milling necessary for proper mixing serves to work harden the copper and requires the use of higher briquetting pressures. Therefore, a better method of mixing is to mix together in a ball mill all the ingredients except the copper. After a uniform mixture has been obtained, the copper powder is added and the whole is remixed, preferably in a rotating screw mixer such as a "Day" mixer. This procedure results in a uniform mixture which can be satisfactorily briquetted.

After mixing the powder is pressed to form a briquette of the desired shape. The pressure used may vary over a wide range, but we have found that 11 tons per square inch is suitable.

After pressing the briquette is then heated in a nonoxidizing atmosphere to a sufficient temperature and for a sufficient length of time to sinter the mixture. We have found that the sintering temperature is rather critical, and that the material should not be heated above a temperature of about 1550° F.—a temperature of 1500° F. giving best results. Higher temperatures than 1550° F. deleteriously affect the fade and frictional properties of the composition. The material is preferably provided with a reinforcing member or backing of solid metal, such as steel, to which it is integrally bonded. One suitable method of doing this is disclosed in Wellman Patent No. 2,178,527. As described in this patent the backing member, after having been suitably cleaned and provided with a thin plating of protective metal, a plating of copper .0002" thick, for example, is assembled with the briquette and placed in a furnace adapted to hold the two members in contact while heating the same in a nonoxidizing atmosphere. The heating operation serves to sinter the material and bond it to the backing member.

The addition of molybdenum sulphide achieves another advantageous result in that the coefficient of friction does not so greatly decrease with increasing temperature. The usual friction material, both metallic and nonmetallic, is rather susceptible to changes in temperature. Thus, in operation of an automobile, a brake lining that may satisfactorily stop the car from a speed of 50 miles per hour when the friction material is relatively cool, usually has a much lower coefficient of friction and considerably higher pedal pressure is required to stop the car after the material becomes heated to a temperature of 300 or 400° F., as will occur when many successive stops are made. Sintered metallic friction material to which molybdenum sulphide has been added does not exhibit this tendency to so great an extent, and, on the contrary, it appears that the coefficient of friction increases with increase in temperature within certain limits.

We do not know why the addition of molybdenum sulphide achieves advantageous results. Molybdenum sulphide is similar to graphite in that it has an hexagonal crystalline structure and has a basal cleavage plane, but, as has been seen, it functions in a manner different from graphite, and apparently is not a material having lubricating properties. The fact that material containing molybdenum sulphide may have a higher coefficient of friction when heated tends to indicate that the molybdenum sulphide may decompose in use to form a surface film of molybdenum oxide on the material, and this oxide may be responsible for the desirable frictional characteristics. Regardless of theory, we have found that molybdenum sulphide is a desirable addition, and that it does improve the frictional properties of sintered metallic friction material.

In Fig. 2 is shown a portion of a brake member in the form of a brake disc, illustrating one form of use for the friction material. In this figure the reference character 10 designates, generally, a brake disc or band friction member for a motorcycle or other motor vehicle, and which comprises a steel disc 11 on which the friction material 12 is secured, either directly or indirectly. The composition of the friction material on this brake disc or band is the same as composition C listed above. This composition, however, may be varied, as indicated by the following formula:

| | Percent by weight |
|---|---|
| Copper | 60–75 |
| Tin | 4–10 |
| Iron | 5–10 |
| Silica | 2–7 |
| Graphite | 3–10 | and 3–12 parts by weight of molybdenum sulphide for each 100 parts by weight of the other ingredients.

The composition may be secured to the brake disc 11 either by bonding the same directly thereon, or by bonding the composition on a backing member 13, which in turn is secured to the brake disc or band 11 by any suitable means, as the rivets 14 or the like.

While the friction material is disclosed as being employed in connection with a disc type of brake, it is understood that it may be used in connection with the band type of brake with equally advantageous results.

Although we have described our invention with particular reference to automotive brakes, it is apparent that the invention is not limited thereto but is applicable to any friction application involving varying speeds and where a high coefficient of friction and small fade is desired.

We claim as our invention:

1. Friction brake and clutch facing material comprising sintered powdered composition consisting predominantly of copper-tin-bronze and containing substantially 3 to 12% of said composition by weight of molybdenum sulphide and characterized by high coefficient of friction and low fade of the coefficient of friction with increasing slipping speed.

2. Friction brake and clutch facing material characterized by high coefficient of friction and low fade of the coefficient of friction with increasing slipping speed, said material comprising substantially

| | Percent by weight |
|---|---|
| Copper | 60–75 |
| Tin | 4–10 |
| Iron | 5–10 |
| Silica | 2–7 |
| Graphite | 3–10 | and 3–12 parts by weight of molybdenum sulphide for each 100 parts by weight of the other ingredients.

3. Friction brake and clutch facing material comprising sintered powdered material characterized by high coefficient of friction and low fade of the coefficient of friction with increasing slipping speed, said material comprising

| | Percent by weight |
|---|---|
| Copper | About 74 |
| Tin | About 5 |
| Iron | About 8 |
| Silica | About 4 |
| Graphite | About 9 |
| | 100 | and molybdenum sulphide six parts by weight to each 100 parts by weight of the other ingredients.

4. Friction brake and clutch facing material comprising sintered powdered material comprising a composition of copper as the major ingredient and tin, iron, silica, graphite, and molybdenum sulphide as the minor ingredients, said molybdenum sulphide being between 3 and 12% of the composition, said friction material being characterized by high coefficient of friction and low fade of the coefficient of friction with increasing slipping speed.

5. A friction brake and clutch facing composition comprising copper as the principal ingredient between 60 and 75% by weight, and tin, iron, silica, graphite and molybdenum sulphide in about equal amounts, the amount of molybdenum sulphide in the composition materially increasing the coefficient of friction of the composition.

6. A friction brake and clutch facing composition comprising

| | Percent by weight |
|---|---|
| Copper | 60–75 |
| Tin | 4–10 |
| Iron | 5–10 |
| Silica | 2–7 |
| Graphite | 3–10 |
| Lead | Up to 15 | and 3–12 parts by weight of molybdenum sulphide for each 100 parts by weight of the other ingredients.

FRANCIS J. LOWEY.
CHARLES H. TOWER.